3,786,075
HYDROXY ETHERS HAVING ODORANT PROPERTIES
Paul Jose Teisseire and Bernard Auger, Grasse, France, assignors to Societe Anonyme des Etablissements Roure-Bertrand Fils & Justin Dupont, Grasse, France
No Drawing. Filed Mar. 23, 1971, Ser. No. 127,359
Claims priority, application Switzerland, Apr. 6, 1970, 5,068/70
Int. Cl. C07c 43/18
U.S. Cl. 260—611 F          4 Claims

ABSTRACT OF THE DISCLOSURE

Compounds of the formula

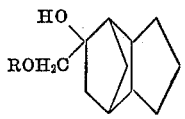

(I)

wherein R is lower alkyl or phenyl are disclosed. Said compounds are useful odorants finding utility in perfume formulations. A process for producing said compounds is also given.

BRIEF SUMMARY OF THE INVENTION

The invention is concerned with novel hydroxy ethers having the formula

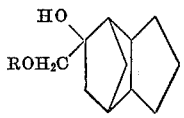

(I)

wherein R represents an alkyl group containing 1 to 3 carbon atoms or a phenyl group.

These novel compounds have been found to be particularly valuable perfume materials which can be used in a wide range of perfume formulations. In particular the compound of Formula I, where R represents an ethyl group, namely 9-ethoxy-methyl-9-hydroxy-tricyclo-[5,2,1,0$^{2,6}$]decane, has a valuable complex odor which is reminiscent both of sandal wood and also of castoreum.

The present invention is concerned with new compounds of the general formula

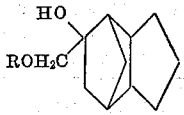

(I)

wherein R represents an alkyl group containing from 1 to 3 carbon atoms (such as methyl, ethyl, propyl, isopropyl) or a phenyl group, and their use as odorants for perfume purposes. The invention is also concerned with perfume compositions containing a hydroxyether of the general Formula I, wherein R has the meaning given above, as well as with a process for the preparation of these new compounds.

According to the present invention there is provided a process for the preparation of compounds of Formula I, which comprises reacting a tricyclo[5,2,1,0$^{2,6}$]decan-9-one, in the presence of magnesium, with a halogenomethyl ether having the general formula $$ROCH_2X \qquad (II)$$

wherein X represents a halogen atom, in particular a chlorine atom, and R has the meaning given above, and then hydrolyzing the reaction product.

The reaction of the tricyclodecanones used as starting material with the halogenomethyl ethers of General Formula II and the subsequent hydrolysis of the reaction product may conveniently be carried out according to the general method given for the preparation of monoethers of tert.-prim. glycols from ketones and chloromethyl ethers, by H. Normant and C. Crisan in Bull. Soc. Chim. Fr. 1959, pp. 459–462.

It is recommended that freshly distilled HX-free methyl ethers of Formula II be used.

The magnesium is preferably used in finely divided form, e.g. in the form of magnesium turnings. The magnesium may also conveniently be used in admixture with mercury chloride (e.g. about 0.5–1.5 g. per mol of magnesium) as an amalgam.

The reaction is conveniently carried out in the presence of a solvent such as tetrahydrofuran which should be water- and peroxide-free.

According to a preferred method of carrying out the process of the present invention, a portion of the halomethyl ether of General Formula II is first dissolved in tetrahydrofuran and is then added to the magnesium. After the reaction has started, the mixture is cooled to about −15° C. to +12° C. and the remainder of the halomethyl ether solution is added together with the solution of the tricyclodecanone in tetrahydrofuran. During the addition of these two solutions, which may be added in any order, the reaction temperature is preferably maintained between −15° C. and +12° C.

The hydrolysis of the reaction complex obtained, may be carried out according to any convenient method, for example by treatment with saturated ammonium chloride solution or with dilute sulphuric acid. The working-up and isolation of the desired hydroxy ether of Formula I may also be carried out according to conventional methods.

The hydroxy ethers of General Formula I show excellent odorant properties and can therefore be used for perfume purposes. They may for example be used in the preparation of perfume compositions (perfumes, etc.) or for the perfuming of cosmetic products (soaps, lotions, creams, etc.) or of cleansing- or washing-agents. The proportion of the hydroxy ether of Formula I used in perfume compositions (e.g. perfumes) or in perfumed products (e.g. soaps) may vary within wide limits according to the desired end-use. Thus, for example, in perfume compositions the proportion may vary from 0.1 up to 50 percent by weight and for commercial and cosmetic products the proportion may vary between 0.01 and 5 percent by weight.

The compound of Formula I wherein R represents an ethyl group, that is 9-ethoxymethyl-9-hydroxy-tricyclo [5,2,1,0$^{2,6}$]decane, is a particular preferred compound according to the present invention on account of its particularly advantageous odorant properties. This compound has a complex odor which is reminiscent both of sandal wood and also of castoreum. The odor also has a slight amber component. The odorant properties of this compound permit it to be used in a particularly wide range of products, it can be used not only in fine perfumes, but also in a variety of perfume bases for use in soaps, cleansing agents, cosmetic products, etc. The corresponding compounds where R=methyl or isopropyl have basically similar odors. All the compounds have a sandal wood, castoreum and amber note in their odors. The odor of the compound where R=ethyl is however preferred for perfume purposes.

The starting material ketone (tricyclo[5,2,1,0$^{2,6}$]decan-9-one) normally exists in two isomeric forms (endo- and exo-). The modification of the 9-keto function according to the process of the present invention gives a further possibility for the formation of two stereoisomers from each of the isomeric forms of the starting materials. The final product of the General Formula I may thus be a mixture of four stereoisomers.

The invention will now be illustrated with reference to the following examples.

EXAMPLE 1

31.4 g. (1.29 mole) of magnesium was placed in a 2 litre 4-neck flask and then covered with some tetrahydrofuran. 1 g. of mercury chloride was then added and the mixture was stirred for 5 minutes. 132.5 g. (1.4 mole) of freshly distilled, HCl-free, chloromethylethyl ether (ClCH$_2$OCH$_2$CH$_3$) and 4 times the volume of tetrahydrofuran was placed in a dropping funnel attached to the four neck flask. 25 ml. of this solution was then run into the flask. After the reaction had commenced the flask was cooled. After the temperature had fallen to 10° C. the remainder of the above mentioned chloromethylethyl ether solution and also a solution of 150 g. (1 mole) of tricyclo[5,2,1,0$^{2,6}$]decan-9-one diluted with twice the volume of tetrahydrofuran were slowly added simultaneously over three hours with continued stirring. During this time and also for the ensuing four hours the temperature was maintained at about 10° C. The tricyclo [5,2,1,0$^{2,6}$]decan-9-one used was mainly in the exo-form with only a small proportion of the endo-form. The reaction mixture was then allowed to reach room temperature. After allowing to stand overnight the reaction mixture was cooled to about 2–5° and then hydrolyzed with 10 percent sulphuric acid. There resulted 9-ethoxymethyl-9-hydroxy-tricyclo[5,2,1,0$^{2,6}$]decane in the amount of 150 g. Yield 71 percent based on the starting ketone. On the basis of chromatographic analysis and also NMR data the product was considered to be sterically mainly a single isomer.

Boiling point 86–88° C./0.5 mm.; $n_D^{20}$=1.4925–1.4927

IR

| | Cm.$^{-1}$ |
|---|---|
| $\nu$ (OH) bonded | 3480 |
| $\nu$ (OH) free | 3575 |
| $\nu$ (—C—O—C—) | 1105 |

The product had an odor which was reminiscent of sandal wood and also of castoreum. The odor also had a slight amber note.

EXAMPLE 2

8 g. of magnesium turnings were introduced into a 1 litre flask equipped with a stirrer and a dropping funnel, and then covered with 30 ml. of anhydrous tetrahydrofuran. 0.3 g. of mercuric chloride were then added. After the reaction had been started by adding a few drops of chloromethylmethylether the flask was cooled to −12° C., and 30 g. chloromethylmethylether diluted with 40 ml. of anhydrous tetrahydrofuran were added with the temperature being held at −12° C. After 90 minutes stirring at −12° C., 37.5 g. of tricyclo[5,2,1,0$^{2,6}$]decan-9-one, diluted with 40 ml. of anhydrous tetrahydrofuran, was added dropwise. The temperature was then maintained for a further 6 hours at −12° C. after the addition of the tricyclodecanone. Hydrolysis was then effected with 345 g. of 10% sulphuric acid. After extraction three times with 50 cc. of ether, the product was washed with 10 cc. of a 9% aqueous sodium bicarbonate solution and then with saturated aqueous sodium chloride until the solution was neutral. The solvent was then distilled off and the product distilled. There was obtained 20.9 g. of 9-methoxymethyl-9-hydroxytricyclo[5,2,1,0$^{2,6}$] decane, representing a yield of 43% and having the following characteristics:

Boiling point 80–81° C./0.5 mm.; $n_D^{15}$=1.4994
IR spectrum:
$\nu$ (OH-alcoholic) associated at 3500 and 3580 cm.$^{-1}$
$\nu$ (C—O— alcoholic) at 1110 cm.$^{-1}$
$\nu$ (C—O— ether) at 1185 and 948 cm.$^{-1}$ Gas chromatography indicated that only one product was present. The product had an odor which was reminiscent of sandal wood and also of castoreum. There was also a very faint amber note in the odor. The odor was however more fruity than that of the compound of Example 1.

EXAMPLE 3

14.6 g. of magnesium turnings were introduced into a 1 litre flask equipped with a stirrer and a dropping funnel, and then covered with 20 ml. of anhydrous tetrahydrofuran. 0.3 g. of mercuric chloride were then added. After the reaction had been started by adding a few drops of chloromethylisopropylether the flask was cooled to −12° C. and 54 g. of chloromethylisopropyl ether diluted with 40 ml. of anhydrous tetrahydrofuran were added over a period of half an hour, during which time the temperature was held at −12° C. After 90 minutes stirring at −12° C., 37.5 g. of tricyclo[5,2,1,0$^{2,6}$]decan-9-one, diluted with 50 ml. of anhydrous tetrahydrofuran, were added dropwise. The temperature was maintained for a further 6 hours at −12° C. after the addition of the tricyclodecanone. Hydrolysis was then effected with 345 g. of 10% sulphuric acid. After extraction three times with 50 cc. of ether, the product was washed with 10 cc. of a 9% aqueous sodium bicarbonate solution until the solution was neutral. The solvent was then distilled off followed by distillation of the product. There was obtained 19.8 g. of 9-isopropyloxymethyl-9-hydroxytricyclo[5,2,1,0$^{2,6}$]-decane, representing a yield of 40% and having the following characteristics:

Boiling point 95–96°/0.5 mm.; $n_D^{15}$=1.4864
Infra-red spectrum:
$\nu$ (OH— alcoholic) associated at 3570 and 3480 cm.$^{-1}$
$\nu$ (C—O— alcoholic) at 1125 cm.$^{-1}$
$\nu$ (C—O— ether) at 1085 and 1060 cm.$^{-1}$
$\nu$ ($\delta$ CH$_3$ dimethyl) at 1370 and 1380 cm.$^{-1}$ Gas chromatography indicated that only one product was present. The product had an odor which was reminiscent of sandal wood and also of castoreum. The odor also had a pronounced amber note.

EXAMPLE 4

| | Parts by weight |
|---|---|
| Bergamotte oil Zest | 170 |
| Lemon oil Zest | 60 |
| Ylang-ylang oil | 90 |
| Geranium oil | 80 |
| C-9 aldehyde 100% | 1 |
| C-10 aldehyde 100% | 1 |
| C-11 aldehyde 100% | 3 |
| C-12 aldehyde 50% | 3 |
| Hydroxydihydrocitronellal | 50 |
| Phenyl acetaldehyde 50% | 10 |
| Lilac (absolute) | 140 |
| Silenol | 171 |
| C-14 aldehyde | 1 |
| Clove oil (absolute) | 40 |
| Musk ambrette | 20 |
| 9 - ethoxymethyl - 9 - hydroxytricyclo[5,2,1,0$^{2,6}$] decane | 160 |
| | 1000 |

EXAMPLE 5

| | Parts by weight |
|---|---|
| Lavender oil Laragne 40% | 10 |
| Bergamotte oil Zest | 120 |
| Lemon oil Zest | 50 |
| Ylang-ylang oil (Nossi-Bé Extra) | 20 |
| Benzyl acetate | 30 |
| Linalyl acetate | 80 |
| Phenylethyl alcohol | 50 |
| Centifol | 10 |
| Geraniol extra | 10 |
| Hydroxydihydrocitronellal | 40 |
| Costus oil (10%) | 5 |
| Clove oil (absolute) | 40 |
| Methyl ionone | 120 |
| Caryophyllenyle acetate | 80 |
| Tabac (Concrète) | 20 |
| Coumarine | 100 |
| Musk ketone | 10 |
| Cyclopentadecanolide | 5 |
| 9 - ethoxymethyl - 9 - hydroxytricyclo[5,2,1,0$^{2,6}$] decane | 200 |
| | 1000 |

We claim:
1. Compounds having the formula

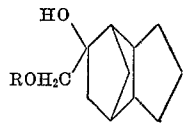

(I)

wherein R represents an alkyl group having 1 to 3 carbon atoms or phenyl.

2. A compound as claimed in claim 1, wherein R is methyl.
3. A compound as claimed in claim 1, wherein R is ethyl.
4. A compound as claimed in claim 1, wherein R is isopropyl.

References Cited

UNITED STATES PATENTS 2,394,582   2/1946   Bruson _____ 260—611 F
3,210,379   10/1965  Porret _____ 260—611 F

OTHER REFERENCES

Bruson et al.: JACS, vol. 68 (1946), pp. 8–10.

BERNARD HELFIN, Primary Examiner

U.S. Cl. X.R.

252—522; 260—613 R